US006973184B1

(12) United States Patent
Shaffer et al.

(10) Patent No.: US 6,973,184 B1
(45) Date of Patent: Dec. 6, 2005

(54) SYSTEM AND METHOD FOR STEREO CONFERENCING OVER LOW-BANDWIDTH LINKS

(75) Inventors: Shmuel Shaffer, Palo Alto, CA (US); Michael E. Knappe, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1001 days.

(21) Appl. No.: 09/614,535

(22) Filed: Jul. 11, 2000

(51) Int. Cl.[7] .......................... H04M 9/08; H04S 5/00
(52) U.S. Cl. .......................... 379/420.01; 379/202.01; 379/388.01; 381/17
(58) Field of Search .......................... 379/93.21, 202, 379/158, 420, 202.01, 420.01, 388.01; 381/17, 381/97; 700/94

(56) References Cited

U.S. PATENT DOCUMENTS 4,581,758 A * 4/1986 Coker et al. .......... 379/206.01
4,815,132 A * 3/1989 Minami .......................... 704/203
6,021,386 A 2/2000 Davis et al. .................. 704/229
6,408,327 B1 * 6/2002 McClennon et al. ........ 709/204

OTHER PUBLICATIONS

Weinstein et al., Experience with Speech Communication in Packet Networks, Dec. 1983, IEEE Journal on Selected Areas in Communications, vol. SAC-1, No. 6.*

Kamen Y. Guentchev and John J. Weng, "Learning-Based Three Dimensional Sound Localization Using a Compact Non-Coplanar Array of Microphones", 1998, pp. 1-9.

* cited by examiner

*Primary Examiner*—Sinh Tran
*Assistant Examiner*—Daniel Swerdlow
(74) *Attorney, Agent, or Firm*—Marger Johnson & McCollom, P.C.

(57) ABSTRACT

Systems and methods are disclosed for packet voice conferencing. An encoding system accepts two sound field signals, representing the same sound field sampled at two spatially-separated points. The relative delay between the two sound field signals is detected over a given time interval. The sound field signals are combined and then encoded as a single audio signal, e.g., by a method suitable for monophonic VoIP. The encoded audio payload and the relative delay are placed in one or more packets and sent to a decoding device via the packet network. The decoding device uses the relative delay to drive a playout splitter—once the encoded audio payload has been decoded, the playout splitter creates multiple presentation channels by inserting the transmitted relative delay in the decoded signal for one (or more) of the presentation channels. The listener thus perceives a speaker's voice as originating from a location related to the speaker's physical position at the other end of the conference. An advantage of these embodiments is that a pseudo-stereo conference can be conducted with virtually the same bandwidth as a monophonic conference.

33 Claims, 8 Drawing Sheets

SYSTEM AND METHOD FOR STEREO CONFERENCING OVER LOW-BANDWIDTH LINKS

FIELD OF THE INVENTION

This present invention relates generally to packet voice conferencing, and more particularly to systems and methods for packet voice stereo conferencing without explicit transmission of two voice channels.

BACKGROUND OF THE INVENTION

Packet-switched networks route data from a source to a destination in packets. A packet is a relatively small sequence of digital symbols (e.g., several tens of binary octets up to several thousands of binary octets) that contains a payload and one or more headers. The payload is the information that the source wishes to send to the destination. The headers contain information about the nature of the payload and its delivery. For instance, headers can contain a source address, a destination address, data length and data format information, data sequencing or timing information, flow control information, and error correction information.

A packet's payload can consist of just about anything that can be conveyed as digital information. Some examples are e-mail, computer text, graphic, and program files, web browser commands and pages, and communication control and signaling packets. Other examples are streaming audio and video packets, including real-time bi-directional audio and/or video conferencing. In Internet Protocol (IP) networks, a two-way (or multipoint) audio conference that uses packet delivery of audio is usually referred to as Voice over IP, or VoIP.

VoIP packets are transmitted continuously (e.g., one packet every 10 to 60 milliseconds) between a sending conference endpoint and a receiving conference endpoint when someone at the sending conference endpoint is talking. This can create a substantial demand for bandwidth, depending on the codec (compressor/decompressor) selected for the packet voice data. In some instances, the sustained bandwidth required by a given codec may approach or exceed the data link bandwidth at one of the endpoints, making that codec unusable for that conference. And in almost all cases, because bandwidth must be shared with other network users, codecs that provide good compression (and therefore smaller packets) are widely sought after.

Usually at odds with the desire for better compression is the desire for good audio quality. For instance, perceived audio quality increases when the audio is sampled, e.g., at 16 kHz vs. the eight kHz typical of traditional telephone lines. Also, quality can increase when the audio is captured, transmitted, and presented in stereo, thus providing directional cues to the listener. Unfortunately, either of these audio quality improvements roughly doubles the required bandwidth for a voice conference.

SUMMARY OF THE INVENTION

The present disclosure introduces new encoding/decoding systems and methods for packet voice conferencing. The systems and methods allow a pseudo-stereo packet voice conference to be conducted with only a negligible increase in bandwidth as compared to a monophonic packet voice conference. In addition to providing a generally more satisfying sound quality than monophonic conferencing, these systems and methods can provide a more tangible benefit when one end of a conference has multiple participants—the ability of the listener to receive a unique directional cue for each speaker on the other end of the conference. Moreover, because only a negligible increase in bandwidth over a monophonic conference is required, the present invention allows the advantages of stereo to be enjoyed over any data link that can support a monophonic conferencing data rate.

In the disclosed embodiments, a multichannel sound field capture system (which may or may not be part of the embodiment) captures sound field signals at spatially-separated points within a sound field. For instance, two microphones can be placed a short distance apart on a table, spatially-separated within a common VoIP phone housing, placed on opposite sides of a laptop computer, etc. The sound field signals exhibit different delays in representing a given speaker's voice, depending on the spatial relationship between the speaker and the microphones.

The sound field signals are provided to an encoding system, where the relative delay is detected over a given time interval. The sound field signals are combined and then encoded as a single audio signal, e.g., by a method suitable for monophonic VoIP. The encoded audio payload and the relative delay are placed in one or more packets and sent to the decoding device via the packet network. The relative delay can be placed in the same packet as the encoded audio payload, adding perhaps a few octets to the packet's length.

The decoding device uses the relative delay to drive a playout splitter—once the encoded audio payload has been decoded, the playout splitter creates multiple presentation channels by inserting a relative delay in the decoded signal for one (or more) of the presentation channels. The listener thus perceives the speaker's voice as originating from a location related to the speaker's actual orientation to the microphones at the other end of the conference.

BRIEF DESCRIPTION OF THE DRAWING

The invention may be best understood by reading the disclosure with reference to the drawing, wherein.

DETAILED DESCRIPTION

In the following description, a packet voice conferencing system exchanges real-time audio conferencing signals with at least one other packet voice conferencing system in packet format. Such a system can be located at a conferencing endpoint (i.e., where a human conferencing participant is located), in an intermediate Multipoint Conferencing Unit (MCU) that mixes or bridges signals from conferencing endpoints, or in a voice gateway that receives signals from a remote endpoint in non-packet format and converts those signals to packet format. MCUs and voice gateways can typically handle more than one simultaneous conference. Note that not every endpoint in a packet voice conference need receive and transmit packet-formatted signals, as MCUs and voice gateways can provide conversion for non-packet endpoints. Such systems are also not limited to voice signals only—other audio signals can be transmitted as part of the conference, and the system can simultaneously transmit packet video or data as well.

Figure 1:
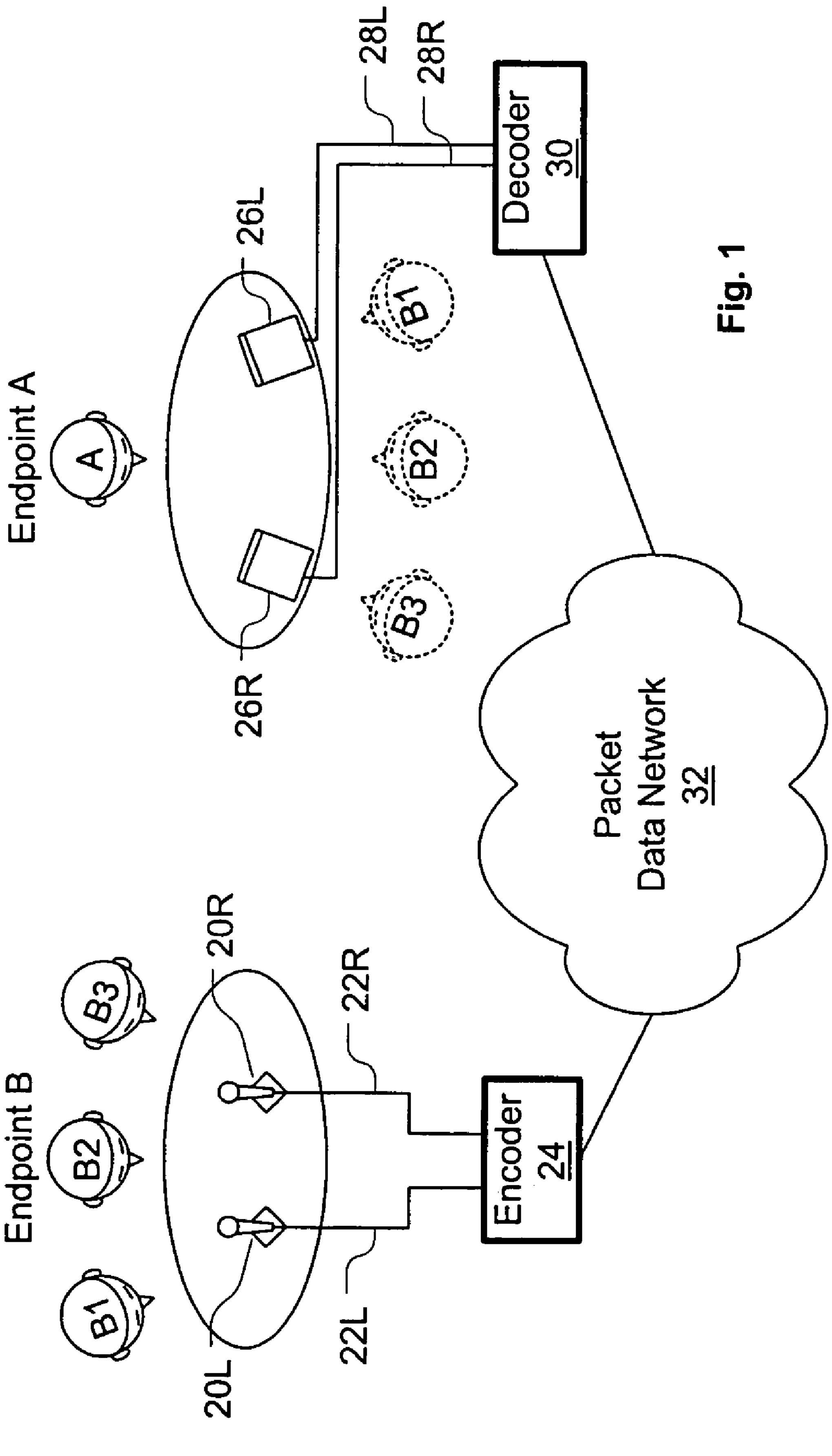
FIG. 1 illustrates the general configuration of a packet-switched stereo telephony system.

As an introduction to the embodiments, the general operation of a stereo packet voice conference will be discussed. Referring to FIG. 1, one-half of a two-way stereo conference between two endpoints (the half allowing A to hear B1, B2, and B3) is depicted. A similar reverse path (not shown) allows A's voice to be heard by B1, B2, and B3. The number of persons present on each end of the conference is not critical, and has been selected in FIG. 1 for illustrative purposes only.

The elements shown in FIG. 1 include: two microphones 20L, 20R connected to an encoder 24 via capture channels 22L, 22R; two acoustic speakers 26L, 26R connected to a decoder 30 via presentation channels 28L, 28R, and a packet data network 32 over which encoder 24 and decoder 30 communicate.

Microphones 20L and 20R simultaneously capture the sound field produced at two spatially-separated locations when B1, B2, or B3 talk, translate the sound field to electromagnetic signals, and transmit those signals over left and right capture channels 22L and 22R. Capture channels 22L and 22R carry the signals to encoder 24.

Encoder 24 and decoder 30 work as a pair. Usually at call setup, the endpoints exchange control packets to establish how they will communicate with each other. As part of this setup, encoder 24 and decoder 30 negotiate a codec that will be used to encode capture channel data for transmission from encoder 24 to decoder 30. The codec may use a technique as simple as Pulse-Code Modulation, or a very complex technique, e.g., one that uses subband coding, predictive coding, and/or vector quantization to decrease bandwidth requirements. In the present invention, the encoder and decoder both have the capability to negotiate a pseudo-stereo codec—this may be a combination of one of the aforementioned monophonic codecs with an added stereo decoding parameter capability. Voice Activity Detection (VAD) may be used to further reduce bandwidth. In order to provide stereo perception of Endpoint B's environment to A, the codec must either encode each capture channel separately, encode a channel matrix that can be decoded to recreate the capture channels, or use a method according to the present invention.

Encoder 24 gathers capture channel samples for a selected time block (e.g., 10 ms), compresses the samples using the negotiated codec, and places them in a packet along with header information. The header information typically includes fields identifying source and destination, timestamps, and may include other fields. A protocol such as RTP (Real-time Transport Protocol) is appropriate for transport of the packet. The packet is encapsulated with lower layer headers, such as an IP (Internet Protocol) header and a link-layer header appropriate for the encoder's link to packet data network 32, and submitted to the packet data network. This process is then repeated for the next time block, and so on.

Packet data network 32 uses the destination addressing in each packet's headers to route that packet to decoder 30. Depending on a variety of network factors, some packets may be dropped before reaching decoder 30, and each packet can experience a somewhat random network transit delay, which in some cases can cause packets to arrive in a different order than that in which they were sent.

Decoder 30 receives the packets, strips the packet headers, and re-orders any out-of-order packets according to timestamp. If a packet arrives too late for its designated playout time, however, the packet will simply be dropped. Otherwise, the re-ordered packets are decompressed and amplified to create two presentation channels 28L and 28R. Channels 28L and 28R drive acoustic speakers 26L and 26R.

Ideally, the whole process described above occurs in a relatively short period, e.g., 250 ms or less from the time B1 speaks until the time A hears B1's voice. Longer delays are detrimental to two-way conversation, but can be tolerated to a point.

A's binaural hearing capability (i.e., A's two ears) allows A to localize each speaker's voice in a distinct location within the listening environment. If the delay (and, to some extent amplitude) differences between the sound field at microphone 20L and at microphone 20R can be faithfully transmitted and then reproduced by speakers 26L and 26R, B1's voice will appear to A to originate at roughly the dashed location shown for B1. Likewise, B2's voice and B3's voice will appear to A to originate, respectively, at the dashed locations shown for B2 and B3.

From studies of human hearing capabilities, it is known that directional cues are obtained via several different mechanisms. The pinna, or outer projecting portion of the ear, reflects sound into the ear in a manner that provides some directional cues, and serves a primary mechanism for locating the inclination angle of a sound source. The primary left-right directional cue is ITD (interaural time delay) for mid-low- to mid-frequencies (generally several hundred Hz up to about 1.5 to 2 kHz). For higher frequencies, the primary left-right directional cue is ILD (interaural level differences). For extremely low frequencies, sound localization is generally poor.

ITD sound localization relies on the difference in time that it takes for an off-center sound to propagate to the far ear as opposed to the nearer ear—the brain uses the phase difference between left and right arrival times to infer the location of the sound source. For a sound source located along the symmetrical plane of the head, no inter-ear phase difference exists; phase difference increases as the sound source moves left or right, the difference reaching a maximum when the sound source reaches the extreme right or left of the head. Once the ITD that causes the sound to appear at the extreme left or right is reached, further delay may be perceived as an echo or cause confusion as to the sound's location.

ILD is based on inter-ear differences in the perceived sound level—e.g., the brain assumes that a sound that seems louder in the left ear originated on the left side of the head. For higher frequencies (where ITD sound localization becomes difficult), humans rely on ILD to infer source location.

Figure 2:
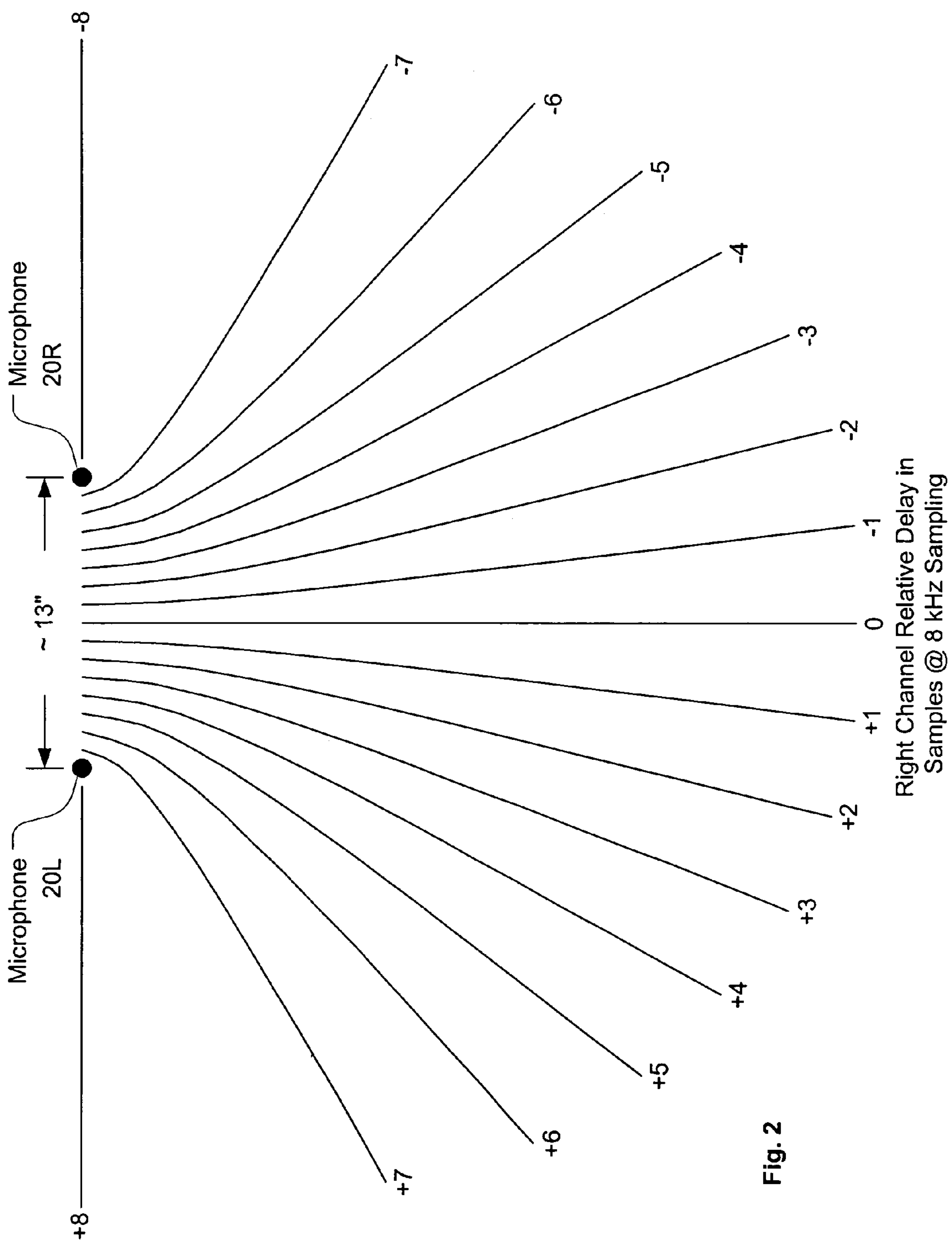
FIG. 2 illustrates a two-dimensional section of a sound field with two microphones, showing lines of constant inter-microphone delay.

For two microphones placed in the same sound field, an ITD-like signal difference can be observed. FIG. 2 shows a two-dimensional scaled spatial plot representing one plane of a three-dimensional sound field. Microphones 20L and 20R are represented spaced 13 inches apart—approximately the distance that sound travels in one millisecond.

Now assume that the sound field signals being captured by microphones 20L and 20R are digitally sampled at eight kHz, or eight samples per millisecond. In the time that it takes eight samples to be gathered, sound can travel the 13 inches between microphone 20L and 20R. Thus a sound originating to the right of microphone 20R would arrive at 20R one millisecond, or eight samples, before it arrives at 20L. The relative delay line "−8" indicates that sounds originating along that line arrive at 20R eight samples before they arrive at 20L, and the relative delay line "+8" indicates the same timing but a reversed order of arrival.

The remainder of the relative delay lines in FIG. 2 show loci of constant relative delay. As the distance to 20L and 20R becomes greater than the spacing between 20L and 20R, the loci begin to approximate straight lines drawn at constant arrival angles. In the eight kHz sampling rate, 13-inch microphone spacing example of FIG. 2, 17 different integer delays are possible. Note that changing either the sampling rate or the spacing between 20L and 20R can vary the number of possible integer sample delays in the pattern. Non-integer delays could also be calculated with an appropriate technique (e.g., oversampling or interpolating).

The encoding embodiments described below have a capability to estimate inter-microphone sound propagation delay and send a stereo decoding parameter related to this delay to a companion decoder. The stereo decoding parameter can relate directly to the estimated sound propagation delay, expressed in samples or units of time. Using a lookup table or formula based on the known microphone configuration, the delay can also be converted to an arrival angle or arrival angle identifier for transmission to the decoder. An arrival-angle-based stereo decoding parameter may be more useful when the decoder has no knowledge of the microphone configuration; if the decoder has such knowledge, it can also compute arrival angle from delay.

In a noiseless, reflectionless environment with a single sound source, a decoder embodiment can produce highly realistic stereo information from a monophonic received audio channel and the stereo decoding parameter. One decoder uses the stereo decoding parameter to split the monophonic channel into two channels—one channel time-shifted with respect to the other to simulate the appropriate ITD for the single sound source. This method degrades for multiple simultaneous sound sources, although it may still be possible to project all of the sound sources to the arrival angle of the strongest source.

Like ITD, ILD can also be estimated, parameterized, and sent along with a monophonic channel. One encoder embodiment compares the signal strength for microphones 20L and 20R and estimates a balance parameter. In many microphone/talker configurations, the signal strength variations between channels may be slight, and thus another embodiment can create an artificial ILD balance parameter based on estimated arrival angle. The decoder can apply the balance parameter to all received frequencies, or it can limit application to those frequencies (e.g., greater than about 1.5 to 2 kHz) where ILD becomes important for sound localization.

Figure 3:
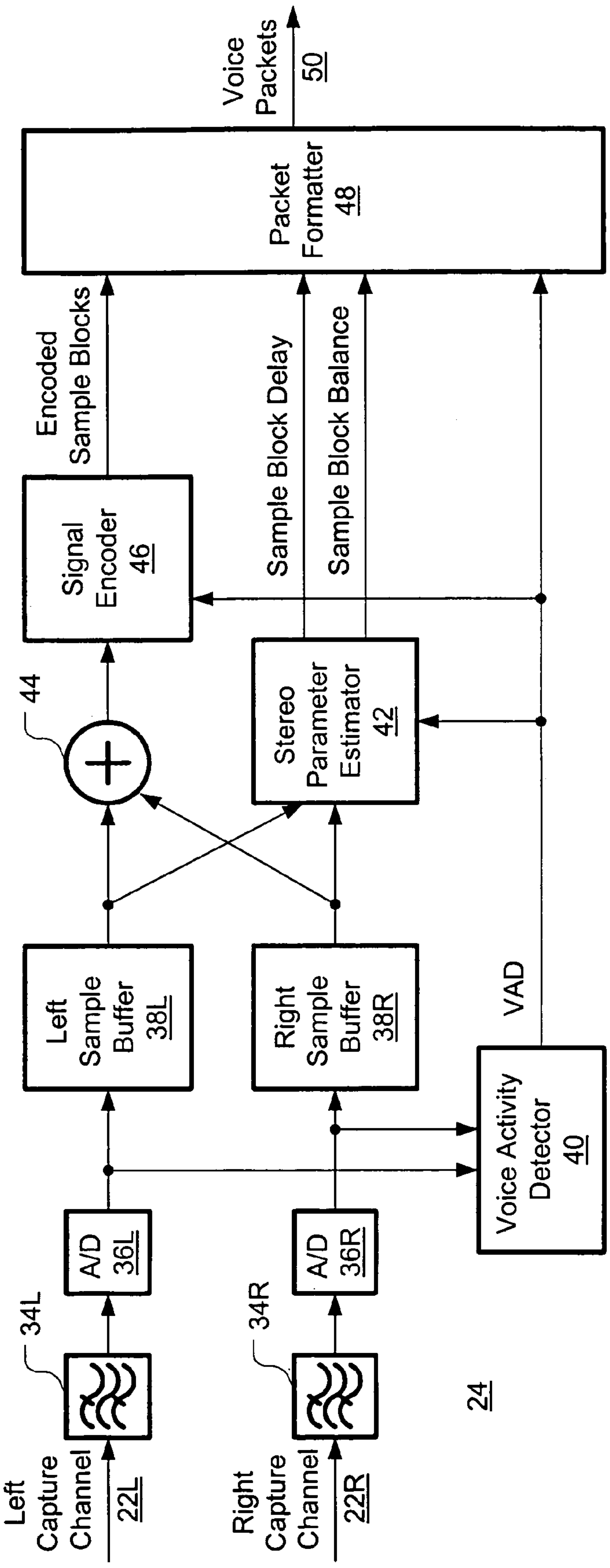
FIG. 3 contains a high-level block diagram for a pseudo-stereo voice encoder according to an embodiment of the invention.

Moving now from the general functional description to the more specific embodiments, FIG. 3 illustrates an encoder 24 for a packet voice conferencing system. Left and right audio capture channels 22L and 22R are passed respectively through filters 34L and 34R. Filters 34L and 34R limit the frequency range of signals on their respective capture channels to a range appropriate for the sampling rate of the system, e.g., 100 Hz to 3400 Hz for an 8 kHz sampling rate. A/D converters 36L and 36R convert the output of filters 34L and 34R, respectively, to digital voice sample streams. The voice sample streams pass respectively to sample buffers 38L and 38R, which store the samples while they await encoding. The voice sample streams also pass to voice activity detector 40, where they are used to generate a VAD signal.

Stereo parameter estimator 42 accepts samples from buffers 38L and 38R. Stereo parameter estimator 42 estimates, e.g., the relative temporal delay between the two sound field signals represented by the sample streams. Estimator 42 also uses the VAD signal as an enabling signal, and does not attempt to estimate relative delay when no voice activity is present. More specifics on methods of operation of stereo parameter estimator 42 will be presented later in the disclosure.

Adder 44 adds one sample from sample buffer 38L to a corresponding sample from sample buffer 38R to produce a combined sample. The adder can optionally provide averaging, or in some embodiments can simply pass one sample stream and ignore the other (other more elaborate mixing schemes, such as partial attenuation of one channel, time-shifting of a channel, etc., are possible but not generally preferred). The main purpose of adder 44 is to supply a single sample stream to signal encoder 46.

Signal encoder 46 accepts and encodes samples in blocks. Typically, encoder 46 gathers samples for a fixed time (or sample period). The samples are then encoded as a block and provided to packet formatter 48. Encoder 46 then gathers samples for the next block of samples and repeats the encoding process. Many monophonic signal encoders are known and are generally suited to perform the function of encoder 46.

Figure 4:
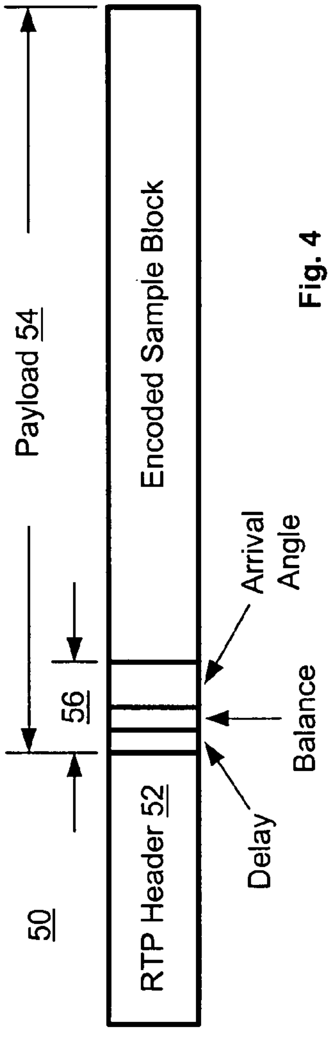
FIG. 4 illustrates one packet format useful with the present invention.

Packet formatter 48 constructs voice packets 50 for transmission. One possible format for a packet 50 is shown in FIG. 4. An RTP header 52 identifies the source, identifies the payload with a timestamp, etc. Formatter 48 may attach lower-layer headers (such as UDP and IP headers, not shown) to packet 50 as well, or these headers may be attached by other functional units before the packet is placed on the network.

The remainder of packet 50 is the payload 54. The stereo decoding parameter field 56 is placed first within the payload section of the packet. A first octet of the stereo decoding parameter field represents delay as a signed 7-bit integer, where the units are time, with a unit value of 62.5 microseconds. Positive values represent delay in the right channel, negative values delay in the left. A second (optional) octet of the stereo decoding parameter field represents balance as a signed 7-bit integer, where one unit represents a half-decibel. Positive values represent attenuation in the right channel, negative values attenuation in the left. Third and fourth (also optional) octets of the stereo decoding parameter field represent arrival angle as a signed 15-bit integer, where the units are degrees. Positive values represent arrival angles to the left of straight ahead; negative values represent arrival angles to the right of straight-ahead. Following the stereo decoding parameter field, an encoded sample block completes the payload of packet 50.

Several possible methods of operation for stereo parameter estimator 42 will now be described with reference to FIGS. 5, 6, and 7.

Figure 5:
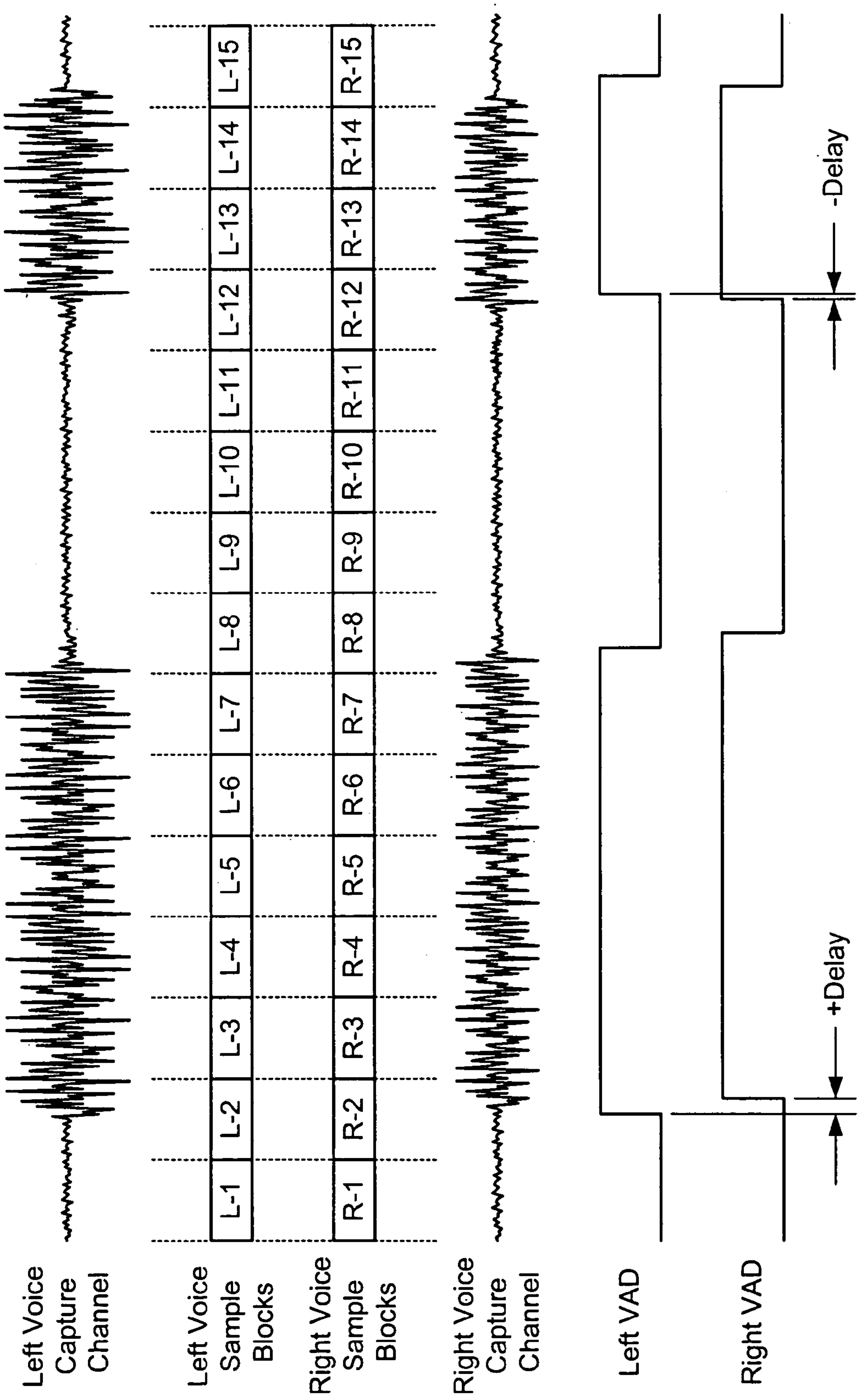
FIG. 5 shows left and right channel voice signals along with their alignment with sampling blocks and voice activity detection signals.
Figure 6:
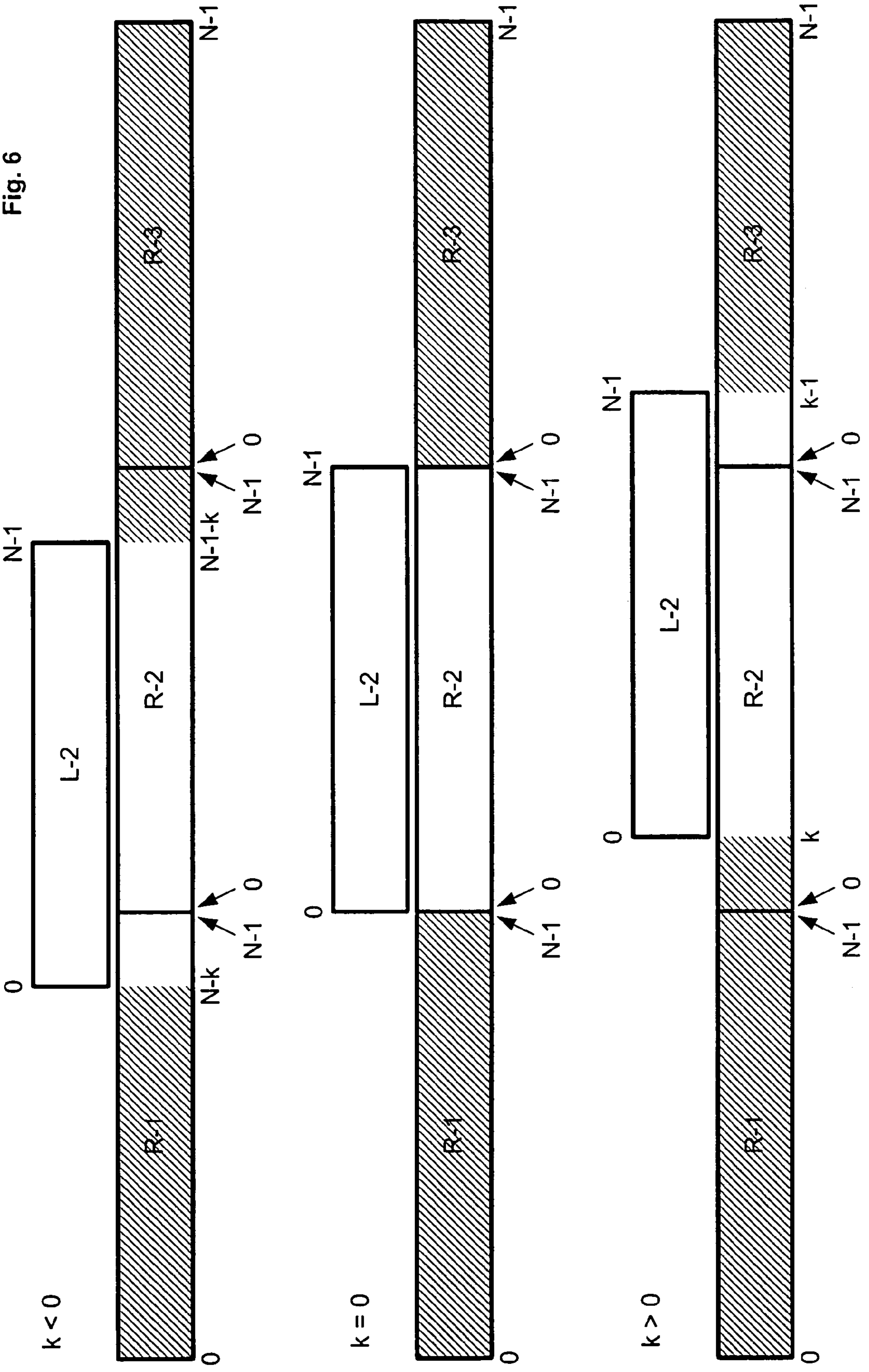
FIG. 6 illustrates correlation alignments for a cross-correlation method according to an embodiment of the invention.

FIG. 5 shows amplitude vs. time plots for time-synchronized left and right voice capture channels. Left voice sample blocks L-1, L-2, . . . , L-15 show blocking boundaries used by signal encoder 46 of FIG. 3 for the left voice capture channel. Right voice sample blocks R-1, R-2, . . . , R-15 show the same blocking boundaries for the right voice capture channel. Left VAD and right VAD signals show the output of voice activity detector 40, where detector 40 computes a separate VAD for each channel. The VAD method employed for each channel is, e.g., to detect the average RMS signal strength within a sliding sample window, and indicate the presence of voice activity when the signal strength is larger than a noise threshold. Note that the VAD signals indicate the beginning and ending points of talkspurts in the speech pattern, with a slight delay (because of the averaging window) in transitioning between on and off.

The on-transition times of the separate VAD signals can be used to estimate the relative delay between the left and right channels. This requires that, first, separate VAD signals be calculated, which is not generally necessary without this delay estimation method. Second, this requires that the time resolution of the VAD signals be sufficient to estimate delay at a meaningful scale. For instance, a VAD signal that is calculated once or twice per sample block will generally not provide sufficient resolution, while one that is calculated every sample generally will.

Stereo parameter estimator 42 receives the left and right components of the VAD signal. When one component transitions to "on", parameter estimator 42 begins a counter, and counts the number of samples that pass until the other component transitions to "on". The counter is then stopped, and the counter value is the delay. A negative delay occurs when the right VAD transitions first, and a positive delay occurs when the left VAD transitions first. When both VAD components transition on the same sample, the counter value is zero.

This delay detection method has several characteristics that may or may not cause problems in a given application. First, since it uses the onset of a talkspurt as a trigger, it produces only one estimate per talkspurt. But unless the speaker is moving very rapidly and speaking very slowly, one estimate per talkspurt is probably sufficient. Also at issue are how suddenly the talkspurt begins and how energetic the voice is—indistinct and/or soft transitions negatively impact how well this method will work in practice. Finally, if one channel receives a signal that is significantly attenuated with respect to the other, this may delay the VAD transition on that channel with respect to the other.

A second delay detection method is cross-correlation. One cross-correlation method is partially depicted in FIG. 6. Assume, as shown in FIG. 5, that the VAD signals turn on during the time period corresponding to sample blocks L-2 and R-2. The delay can be estimated during the approximate timeframe of this time period by cross-correlation using one of several possible methods of sample selection.

In a first method, a cross-correlator for a given sample block time period (e.g., the L-2 time period as shown) cross-correlates the samples in one sample stream from that sample block with samples from the other sample stream. As shown in FIG. 6, samples 0 to N−1 of block L-2 (a length-N block) are used in the correlation. A sample index shift distance k determines how block L-2 is aligned with the right sample stream for each correlation point. Thus, when k<0, L-2 is shifted forward, such that sample 0 of block L-2 is correlated with sample N−k of block R-1, and sample N−1 of block L-2 is correlated with sample N−1−k of block R-2. Likewise, when k>0, L-2 is shifted backward, such that sample 0 of block L-2 is correlated with sample k of block R-2, and sample N−1 of block L-2 is correlated with sample k−1 of block R-3. For the special case k=0, which represents zero relative delay, blocks L-2 and R-2 are correlated directly.

One expression for a cross-correlation coefficient $R_{i,k}$ (others exist) is given below. In this expression, i is a sample index, L(i) is the left sample with index i, R(i) is the right sample with index i, N is the number of samples being cross-correlated, and k is an index shift distance.

$$R_{i,k}=\frac{N\sum_{j=i}^{i+N-1}L(j)R(j+k)-\sum_{j=i}^{i+N-1}L(j)\sum_{j=i}^{i+N-1}R(j+k)}{\sqrt{N\sum_{j=i}^{i+N-1}L(j)^2-\left(\sum_{j=i}^{i+N-1}L(j)\right)^2}\sqrt{N\sum_{j=i}^{i+N-1}R(j+k)^2-\left(\sum_{j=i}^{i+N-1}R(j+k)\right)^2}} \quad (1)$$

A separate coefficient $R_{i,k}$ is calculated for each index shift distance k under consideration. It is noted, however, that several of the required summations do not vary with k, and need only be calculated once for a given i and N. The remaining summations (except for the summation that cross-multiplies L(i) with R(i+k))do vary with k, but have many common terms for different values of k—this commonality can also be exploited to reduce computational load. It is also noted that if a running estimate is to be kept, e.g., since the beginning of a talkspurt, the summations can simply be updated as new samples are received.

Figure 7:
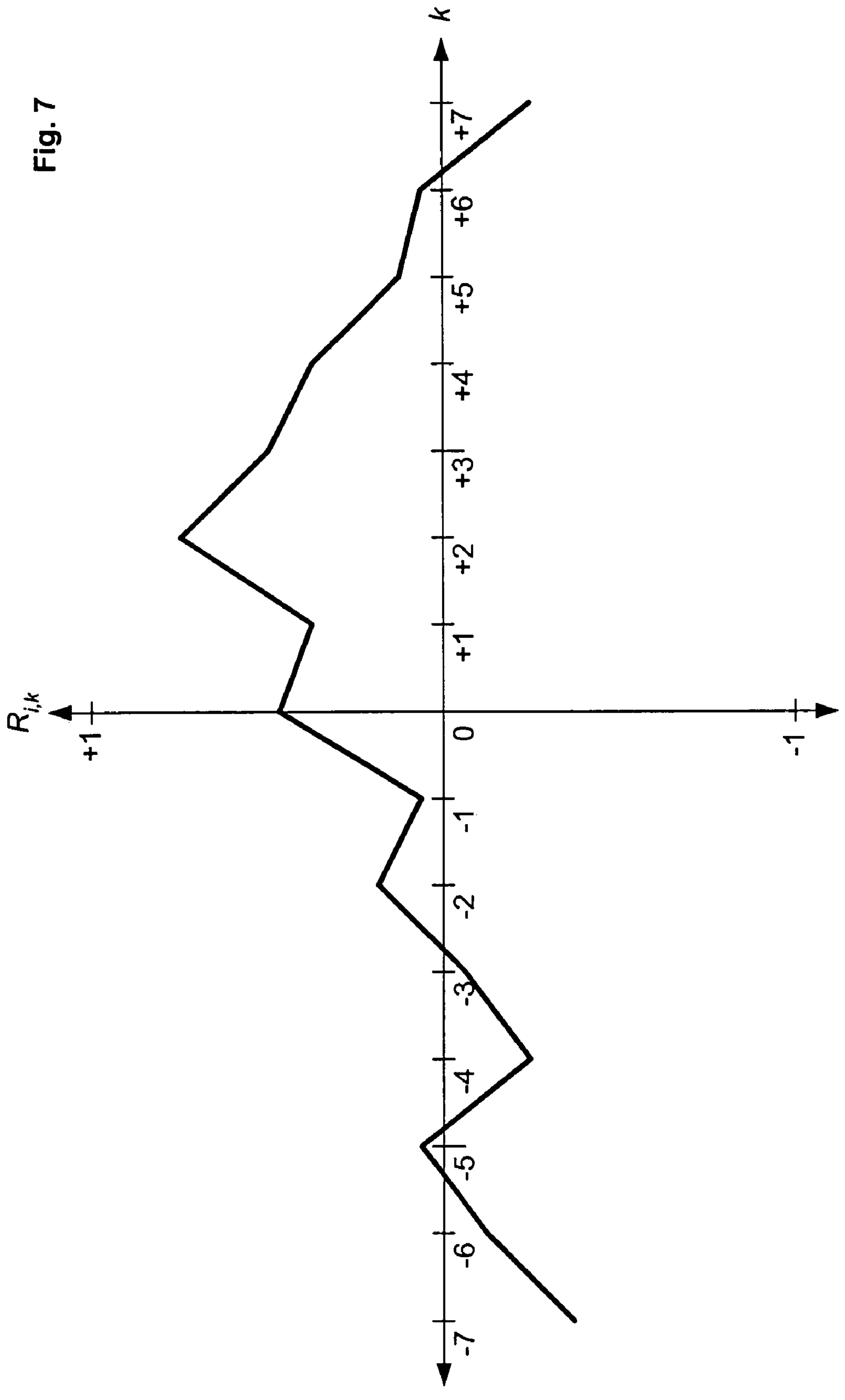
FIG. 7 illustrates left-to-right channel cross-correlation vs. sample index distance.

FIG. 7 contains an exemplary plot showing how $R_{i,k}$ can vary from a theoretical maximum of 1 (when L(i) and R(i) are perfectly correlated for a shift distance k) to a theoretical minimum of −1 (when the perfect correlation is exactly out of phase). A $R_{i,k}$ of zero indicates no correlation, which would be expected when a random white noise sequence of infinite length is correlated with a second signal. When L(i) and R(i) capture the same sound field, with a dominant sound source, a positive maximum value in $R_{i,k}$ should indicate the relative temporal delay in the two signals, since that is the point where the two signals best match. In FIG. 7, the largest cross-correlation figure is obtained for a sample index shift distance of +2—thus +2 would correspond to the estimated relative temporal delay for this example.

With the above method, a separate estimate of relative temporal delay can be made for each sample block that is encoded by signal encoder 46. The delay estimate can be placed in the same packet as the encoded sample block. It can be placed in a later packet as well, as long as the decoder understands how to synchronize the two and receives the delay estimate before the encoded sample block is ready for playout.

It may be preferable to limit the variation of the estimated relative temporal delay during a talkspurt. For instance, once an initial delay estimate for a given talkspurt has been sent to the decoder, variation from this estimate can be held relatively (or rigidly) constant, even if further delay estimates differ. One method of doing this is to use the first several sample blocks of the talkspurt to compute a single, good estimate of delay, which is then held constant for the duration of the talkspurt. Note that even if one estimate is used, it may be preferable to send it to the decoder in multiple packets in case one packet is lost.

A second method for limiting variation in estimated delay is as follows. After the stereo parameter estimator transmits a first delay estimate, the stereo parameter estimator continues to calculate delay estimates, either by adding more samples to the original cross-correlation summations as those samples become available, or by calculating a separate delay for each new sample block. When separate delay estimates are calculated for each block, the transmitted delay estimate can be the output of a smoothing filter, e.g., an average of the last n delay estimates.

The summations used in calculating a delay estimate can also be used to calculate a stereo balance parameter. Once the shift index k generating the largest cross-correlation coefficient is known, the RMS signal strengths for the time-shifted sequences can be ratioed to form a balance figure, e.g., a balance parameter $B_{L/R}$ can be computed in decibels as:

$$B_{L/R} = 10\log\left(\frac{N\sum_{j=i}^{i+N-1} L(j)^2 - \left(\sum_{j=i}^{i+N-1} L(j)\right)^2}{N\sum_{j=i}^{i+N-1} R(j+k)^2 - \left(\sum_{j=i}^{i+N-1} R(j+k)\right)^2}\right) \tag{2}$$

Optionally, a balance parameter can be calculated only for a higher-frequency subband, e.g., 1.5 kHz to 3.4 kHz. Both sample streams are highpass-filtered, and the resulting sample streams are used in an equation like equation (2). Alternatively, once arrival angle is known, a lookup function can simply determine an appropriate ILD that a human would observe for that arrival angle. The balance parameter can simply express the balance figure that corresponds to that ILD.

Figure 8:
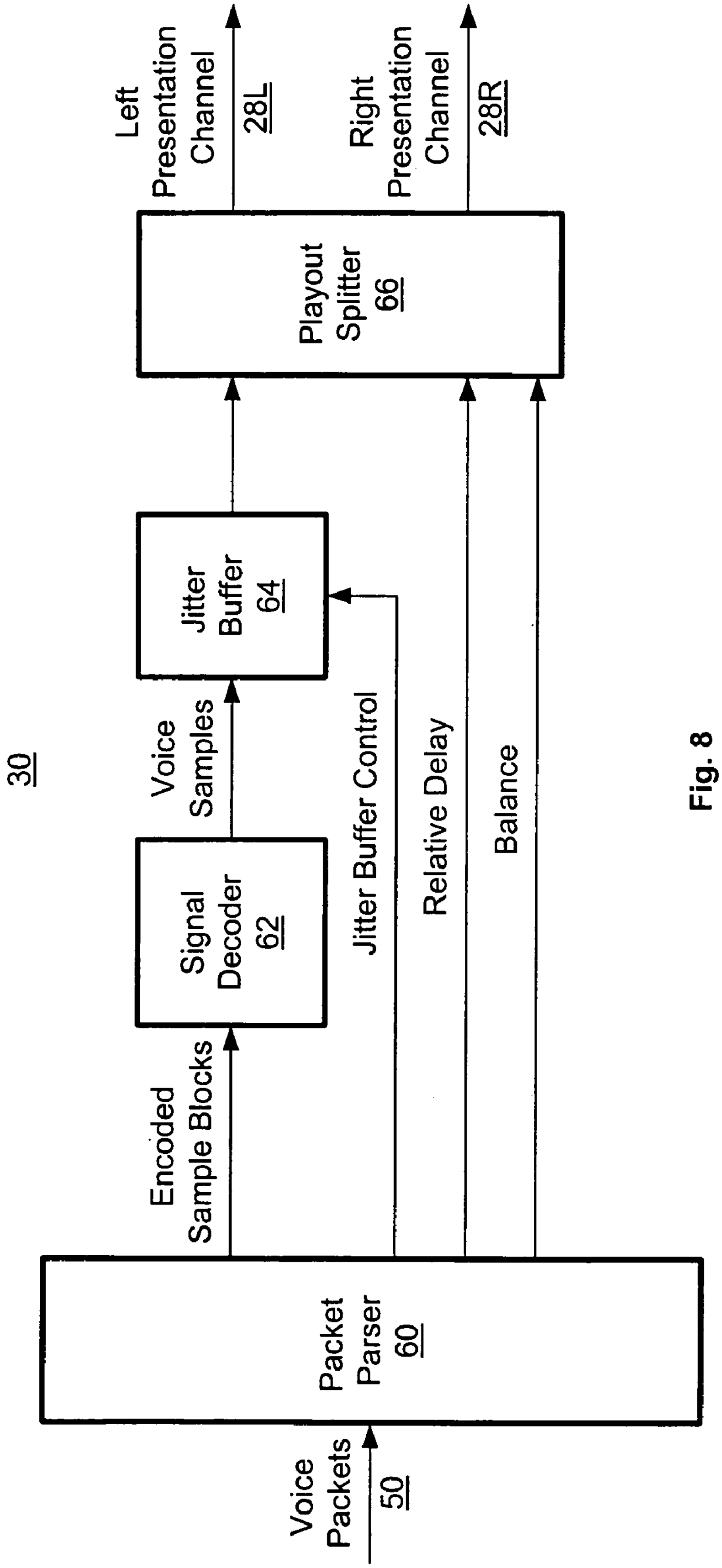
FIG. 8 contains a high-level block diagram for a pseudo-stereo voice decoder according to an embodiment of the invention.

Turning now to a discussion of a companion decoder for the disclosed encoders, FIG. 8 shows a decoder 30. Voice packets 50 arrive at a packet parser 60, which splits each packet into its component parts. The packet header of each packet is used by the packet parser itself to control jitter buffer 64, reorder out-of-order packets, etc., e.g., in one of the ways that is well understood by those skilled in the art. The stereo decoding parameter components (e.g., relative delay, balance, and arrival angle) are passed to playout splitter 66. In addition, the encoded sample blocks are passed to signal decoder 62.

Signal decoder 62 decodes the encoded sample blocks to produce a monophonic stream of voice samples. Jitter buffer 64 stores these voice samples, and makes them available for playout after a delay that is set by packet parser 60. Playout splitter 66 receives the delayed samples from jitter buffer 64.

Playout splitter 66 forms left and right presentation channels 28L and 28R from the voice sample stream received from jitter buffer 64. One implementation of playout splitter 66 is detailed in FIG. 9. The voice samples are input to a k-stage delay register 70, where k is the largest allowable delay in samples. The voice samples are also input directly to input 10 of a (k+1)-input multiplexer. Each stage of delay register 70 has its output tied to a corresponding input of multiplexer 72, i.e., stage D1 of register 70 is tied to input I1 of multiplexer 72, etc.

The delay magnitude bits that correspond to integer units of delay address multiplexer 72. Thus, when the delay magnitude bits are 0000, input 10 of multiplexer 72 is output on OUT, when the delay magnitude bits are 0011, input I3 of multiplexer 72 (a three-sample-delayed version of the input) is output on OUT, etc. Note that when the delay magnitude increases by one, a voice sample will be repeated on OUT. Similarly, when the delay magnitude decreases by one, a voice sample will be skipped on OUT.

Switch 74 determines whether the sample-delayed voice sample stream on OUT will be placed on the left or the right output channel. When the delay sign bit is set, the delayed voice sample stream is switched to left channel 74L. Otherwise, the delayed voice sample stream is switched to right channel 74R. Switch 74 sends the no-delayed version of the voice sample stream to the channel that is not currently receiving the delayed version.

When the decoding system is to create an ILD effect in the output, additional hardware such as exponentiator 76, switch 78, and multipliers 80 and 82 can be added to splitter 66. Exponentiator 76 takes the magnitude bits of the balance parameter and exponentiates them to compute an attenuation factor. The sign of the balance parameter operates a switch 78 that applies the attenuation factor to either the left or the right channel. When the balance sign bit is set, the attenuation factor is switched to left channel 78L. Otherwise, the attenuation factor is switched to right channel 78R. Switch 78 sends an attenuation factor of 1.0 (i.e., no attenuation) to the channel that is not currently receiving the received attenuation factor.

Multipliers 80 and 82 transfer attenuation to the output channels. Multiplier 80 multiplies channel 74L with switch output 78L to produce left presentation channel 28L. Multiplier 82 multiplies channel 74R with switch output 78R to produce right presentation channel 28R. Note that if it is desired to attenuate only high frequencies, the multipliers can be augmented with filters to attenuate only the higher frequency components.

The illustrated embodiments are generally applicable to use in a voice conferencing endpoint. With a few modifications, these embodiments also apply to implementation in an MCU or voice gateway.

MCUs are usually used to provide mixing for multi-point conferences. The MCU could possibly: (1) receive a pseudo-stereo packet stream according to the invention; (2) send a pseudo-stereo packet stream according to the invention; or (3) both.

Figure 9:
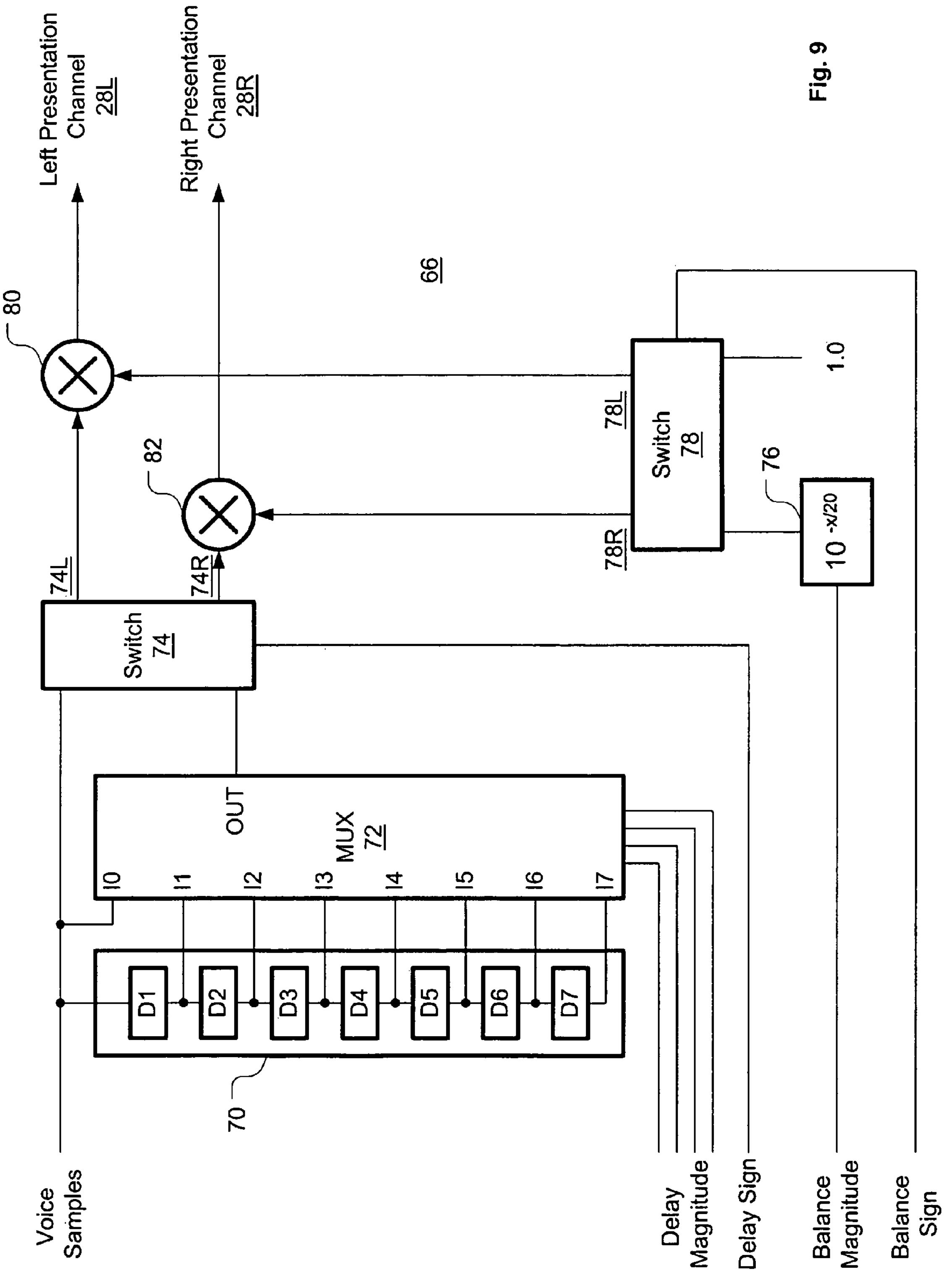
FIG. 9 contains a block diagram for a decoder playout splitter according to an embodiment of the invention.

When receiving a pseudo-stereo packet stream, the MCU can decode it as described in the description accompanying FIGS. 8 and 9. The difference would be in that the presentation channels would possibly be mixed with other channels and then transmitted to an endpoint, most likely in a packet format.

When sending a pseudo-stereo packet stream, the MCU must encode such a stream. Thus, the MCU must receive a stereo stream from which it can determine delay. The stereo stream could be in packet format, but would preferably use a PCM or similar codec that would preserve the left and right channels with little distortion until they reached the MCU.

When the MCU both receives and transmits a pseudo-stereo stream, it need not perform delay detection on a mixed output stream. For mixed channels, the received delays can be averaged, arbitrated such that the channel with the most signal energy dominates the delay, etc.

A voice gateway is used when one voice conferencing endpoint is not connected to the packet network. In this instance, the voice gateway connects to the endpoint over a circuit-switched or dedicated data link (albeit a stereo data link). The voice gateway receives stereo PCM or analog stereo signals from the endpoint, and transmits the same in the opposite direction. The voice gateway performs encoding and/or decoding according to the invention for communication across the packet data network with another conferencing point.

Although several embodiments of the invention and implementation options have been presented, one of ordinary skill will recognize that the concepts described herein can be used to construct many alternative implementations. Such implementation details are intended to fall within the scope of the claims. For example, a playout splitter can map a pseudo-stereo voice data channel to, e.g., a 3-speaker (left, right, center) or 5.1 (left-rear, left, center, right, right-rear, subwoofer) format. Alternatively, the encoder can accept more than two channels and compute more than one delay. Although a detailed digital implementation has been described, many of the components have equivalent analog implementations, for example, the playout splitter, the stereo parameter estimator, the adder, and the voice activity detector. Alternative component arrangements are also possible, e.g., the stereo parameter estimator can retrieve samples before they pass through the sample buffers, or the voice activity detector and the stereo parameter estimator can share common functionality. The particular packet and parameter format used to transmit data between encoder and decoder are application-dependent.

Particular device embodiments, or subassemblies of an embodiment, can be implemented in hardware. All device embodiments can be implemented using a microprocessor executing computer instructions, or several such processors can divide the tasks necessary to device operation. Thus another claimed aspect of the invention is an apparatus comprising a computer-readable medium containing computer instructions that, when executed, cause one or more processors to execute a method according to the invention.

The network could take many forms, including cabled telephone networks, wide-area or local-area packet data networks, wireless networks, cabled entertainment delivery networks, or several of these networks bridged together. Different networks may be used to reach different endpoints. Although the detailed embodiments use Internet Protocol packets, this usage is merely exemplary—the particular protocols selected for a given implementation are not critical to the operation of the invention.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A packet voice conferencing method comprising:

receiving concurrently-captured first and second sound field signals, the first and second sound field signals representing a single sound field captured at two spatially-separated points within a sound field;

digitally encoding a signal block to represent the first and second sound field signals as captured during a first time period;

estimating the relative temporal delay between the first and second sound field signals within the approximate timeframe of the first time period;

transmitting to a remote conferencing point, in packet format, both the encoded signal block and a stereo decoding parameter based on the estimated relative temporal delay; and wherein estimating the relative temporal delay further comprises calculating, for each of a plurality of relative time shifts, a first-to-second sound field signal cross-correlation coefficient, selecting the relative temporal delay to correspond to the relative time shift generating the largest cross-correlation coefficient, and tracking the beginning and ending of a talkspurt represented in the sound field signals, and limiting the variation of the estimated relative temporal delay during a talkspurt.

2. The method of claim 1, wherein digitally encoding a signal block comprises combining the first and second sound field signals into a composite sound field signal by a method selected from the group of methods consisting of:

selecting one sound field signal as the source of the composite sound field signal and discarding the other sound field signal;

summing the first and second sound field signals; and averaging the first and second sound field signals.

3. The method of claim 1, wherein the relative temporal delay associated with the first time period is estimated using substantially only the sound field signals captured during the first time period.

4. A packet voice conferencing method comprising:

receiving concurrently-captured first and second sound field signals, the first and second sound field signals representing a single sound field captured at two spatially-separated points within a sound field;

digitally encoding a signal block to represent the first and second sound field signals as captured during a first time period;

estimating the relative temporal delay between the first and second sound field signals within the approximate timeframe of the first time period;

transmitting to a remote conferencing point, in packet format, both the encoded signal block and a stereo decoding parameter based on the estimated relative temporal delay; and wherein estimating the relative temporal delay further comprises tracking the beginning and ending of a talkspurt represented in the sound field signals, wherein relative temporal delay associated with the first time period is estimated using substantially all of the sound field signals corresponding to the current talkspurt, up to and including at least a first portion of the first time period.

5. A packet voice conferencing method comprising:

receiving concurrently-captured first and second sound field signals, the first and second sound field signals representing a single sound field captured at two spatially-separated points within a sound field;

digitally encoding a signal block to represent the first and second sound field signals as captured during a first time period;

estimating the relative temporal delay between the first and second sound field signals within the approximate timeframe of the first time period;

transmitting to a remote conferencing point, in packet format, both the encoded signal block and a stereo decoding parameter based on the estimated relative temporal delay; and wherein estimating the relative temporal delay comprises detecting the beginning time of a talkspurt in each of the sound field signals, and selecting the relative temporal delay for a talkspurt to correspond to the difference in beginning times detected for that talkspurt.

6. A packet voice conferencing method comprising:

receiving concurrently-captured first and second sound field signals, the first and second sound field signals representing a single sound field captured at two spatially-separated points within a sound field;

digitally encoding a signal block to represent the first and second sound field signals as captured during a first time period;

estimating the relative temporal delay between the first and second sound field signals within the approximate timeframe of the first time period;

transmitting to a remote conferencing point, in packet format, both the encoded signal block and a stereo decoding parameter based on the estimated relative temporal delay; and wherein the stereo decoding parameter expresses the estimated relative temporal delay between the first and second sound field signals as an integer number of digital sampling intervals.

7. The method of claim 1, wherein the stereo decoding parameter expresses an estimated angle of arrival based on the estimated relative temporal delay and the relative positioning of the first and second spatially-separated points.

8. A packet voice conferencing method comprising:

receiving concurrently-captured first and second sound field signals, the first and second sound field signals representing a single sound field captured at two spatially-separated points within a sound field;

digitally encoding a signal block to represent the first and second sound field signals as captured during a first time period;

estimating the relative temporal delay between the first and second sound field signals within the approximate timeframe of the first time period;

transmitting to a remote conferencing point, in packet format, both the encoded signal block and a stereo decoding parameter based on the estimated relative temporal delay; and wherein the stereo decoding parameter corresponding to the digitally-encoded signal block representing the first time period is transmitted in the same packet as the digitally-encoded signal block.

9. A packet voice conferencing method comprising:

receiving concurrently-captured first and second sound field signals, the first and second sound field signals representing a single sound field captured at two spatially-separated points within a sound field;

digitally encoding a signal block to represent the first and second sound field signals as captured during a first time period;

estimating the relative temporal delay between the first and second sound field signals within the approximate timeframe of the first time period;

transmitting to a remote conferencing point, in packet format, both the encoded signal block and a stereo decoding parameter based on the estimated relative temporal delay; and wherein the stereo decoding parameter corresponding to the digitally-encoded signal block representing the first time period is transmitted in a later packet than the digitally-encoded signal block.

10. A packet voice conferencing method comprising:

receiving concurrently-captured first and second sound field signals, the first and second sound field signals representing a single sound field captured at two spatially-separated points within a sound field;

digitally encoding a signal block to represent the first and second sound field signals as captured during a first time period;

estimating the relative temporal delay between the first and second sound field signals within the approximate timeframe of the first time period;

transmitting to a remote conferencing point, in packet format, both the encoded signal block and a stereo decoding parameter based on the estimated relative temporal delay; and wherein the stereo decoding parameter corresponding to the digitally-encoded signal block representing the first time period is transmitted in a packet separate from any digitally-encoded signal block.

11. A packet voice conferencing method comprising:

receiving concurrently-captured first and second sound field signals, the first and second sound field signals representing a single sound field captured at two spatially-separated points within a sound field;

digitally encoding a signal block to represent the first and second sound field signals as captured during a first time period;

estimating the relative temporal delay between the first and second sound field signals within the approximate timeframe of the first time period;

transmitting to a remote conferencing point, in packet format, both the encoded signal block and a stereo decoding parameter based on the estimated relative temporal delay; and wherein the stereo decoding parameter is transmitted once per talkspurt.

12. A packet voice conferencing method comprising:

receiving concurrently-captured first and second sound field signals, the first and second sound field signals representing a single sound field captured at two spatially-separated points within a sound field;

digitally encoding a signal block to represent the first and second sound field signals as captured during a first time period;

estimating the relative temporal delay between the first and second sound field signals within the approximate timeframe of the first time period;

transmitting to a remote conferencing point, in packet format, both the encoded signal block and a stereo decoding parameter based on the estimated relative temporal delay; and estimating the signal energy present in each sound field signal during the approximate timeframe of the first time period, and transmitting to the remote conferencing endpoint, in packet format, an explicit stereo balance parameter related to the relative signal energy in each sound field signal.

13. A packet voice conferencing method comprising:

receiving concurrently-captured first and second sound field signals, the first and second sound field signals representing a single sound field captured at two spatially-separated points within a sound field;

digitally encoding a signal block to represent the first and second sound field signals as captured during a first time period;

estimating the relative temporal delay between the first and second sound field signals within the approximate timeframe of the first time period;

transmitting to a remote conferencing point, in packet format, both the encoded signal block and a stereo decoding parameter based on the estimated relative temporal delay; and estimating the signal energy present in a frequency subband of each sound field signal during the approximate timeframe of the first time period, and transmitting to the remote conferencing endpoint, in packet format, an explicit stereo balance parameter related to the relative signal energy in that subband for each sound field signal.

14. A packet voice conferencing method comprising:

receiving concurrently-captured first and second sound field signals, the first and second sound field signals representing a single sound field captured at two spatially-separated points within a sound field;

digitally encoding a signal block to represent the first and second sound field signals as captured during a first time period;

estimating the relative temporal delay between the first and second sound field signals within the approximate timeframe of the first time period;

transmitting to a remote conferencing point, in packet format, both the encoded signal block and a stereo decoding parameter based on the estimated relative temporal delay; and establishing a packet-based control protocol with the remote conferencing point, and using the control protocol to inform the remote conferencing point that an encoder performing the method of claim 1 is available for stereo packet voice conferencing.

15. A packet voice conferencing system comprising:

a packet parser to receive voice packets received from a remote conferencing point, each voice packet containing at least one of an encoded signal block and a stereo decoding parameter, the stereo decoding parameter comprising at least one of an explicit delay parameter, an explicit balance parameter, and an explicit arrival angle parameter;

a decoder to receive encoded signal blocks from the packet parser and decode those signal blocks to produce a voice sample stream; and a playout splitter coupled to the voice sample stream, the splitter using the stereo decoding parameter to create multiple output signal channels based on the voice sample stream.

16. The packet voice conferencing system of claim 15, further comprising a jitter buffer inserted in the voice sample stream between the decoder and the playout splitter.

17. The packet voice conferencing system of claim 15, wherein the stereo decoding parameter comprises an explicit delay parameter, the splitter delaying playout of the voice sample stream on at least one output signal channel, relative to playout of the voice sample stream on another output signal channel, based on the value of the explicit delay parameter.

18. The packet voice conferencing system of claim 15, wherein the stereo decoding parameter comprises an explicit balance parameter, the splitter modifying the playout amplitude of the voice sample stream on at least one output signal channel, relative to the playout amplitude of the voice sample stream on another output signal channel, based on the value of the explicit balance parameter.

19. The packet voice conferencing system of claim 18, wherein the playout amplitude modification is audio-frequency dependent.

20. The packet voice conferencing system of claim 15, further comprising a mixer to mix the output signal channels with other signal channels derived from voice packets received from another remote conferencing point.

21. The packet voice conferencing system of claim 20, further comprising a packet formatter to place the mixer output in packet format for transmission to a remote conferencing endpoint.

22. A packet voice conferencing system comprising:

means for decoding encoded signal blocks to produce a voice sample stream, each encoded signal block received in packet format from a remote conferencing point; and means for splitting, based on the value of a stereo decoding parameter received in packet format from a remote conferencing point, the voice sample stream into multiple output signal channels to produce a stereophonic effect, the stereo decoding parameter comprising at least one of an explicit delay parameter, an explicit balance parameter, and an explicit arrival angle parameter.

23. The packet voice conferencing system of claim 22, wherein the stereo decoding parameter comprises an explicit delay parameter, the means for splitting the voice sample stream comprising means for delaying playout of the voice sample stream on at least one output signal channel, relative to playout of the voice sample stream on another output signal channel, based on the value of the explicit delay parameter.

24. The packet voice conferencing system of claim 22, wherein the stereo decoding parameter comprises an explicit balance parameter, the means for splitting the voice sample stream comprising means for modifying the playout amplitude of the voice sample stream on at least one output signal channel, relative to the playout amplitude of the voice sample stream on another output signal channel, based on the value of the explicit balance parameter.

25. The packet voice conferencing system of claim 22, wherein the stereo decoding parameter comprises an explicit arrival angle parameter, the means for splitting the voice sample stream comprising means for calculating a delay parameter for at least one output signal channel to create the perception that the audio signal represented in the voice sample stream is arriving at an angle corresponding to the explicit arrival angle parameter.

26. A packet voice conferencing method comprising:

receiving, from a remote conferencing point, a voice packet stream, at least some voice packets in the stream carrying a payload comprising an encoded signal block, at least some voice packets in the stream carrying a payload comprising a stereo decoding parameter, the stereo decoding parameter comprising at least one of an explicit delay parameter, an explicit balance parameter, and an explicit arrival angle parameter;

decoding the encoded signal blocks to produce a voice sample stream;

splitting the voice sample stream into multiple output signal channels; and manipulating the signal carried on at least one of the output signal channels based on the value of the stereo decoding parameter to create a stereophonic effect on the output signal channels.

27. The method of claim 26, wherein the stereo decoding parameter comprises an explicit delay parameter, and wherein manipulating the signal carried on at least one of the output signal channels comprises delaying playout of the voice sample stream on at least one output signal channel, relative to playout of the voice sample stream on another output signal channel, based on the value of the explicit delay parameter.

28. The method of claim 26, wherein the stereo decoding parameter comprises an explicit balance parameter, and wherein manipulating the signal carried on at least one of the output signal channels comprises modifying the playout amplitude of the voice sample stream on at least one output signal channel, relative to the playout amplitude of the voice sample steam on another output signal channel, based on the value of the explicit balance parameter.

29. The method of claim 26, wherein the stereo decoding parameter comprises an explicit arrival angle parameter, and wherein manipulating the signal carried on at least one of the output signal channels comprises calculating a delay parameter for at least one output signal channel to create the perception that the audio signal represented in the voice sample stream is arriving at an angle corresponding to the explicit arrival angle parameter.

30. An apparatus comprising a computer-readable medium containing computer instructions that, when executed, cause a processor or multiple communicating processors to perform a method for packet voice conferencing, the method comprising:

receiving, from a remote conferencing point, a voice packet stream, at least some voice packets in the stream carrying a payload comprising an encoded signal block, at least some voice packets in the stream carrying a payload comprising a stereo decoding parameter, the stereo decoding parameter comprising at least one of an explicit delay parameter, an explicit balance parameter, and an explicit arrival angle parameter;

decoding the encoded signal blocks to produce a voice sample stream;

splitting the voice sample stream into multiple output signal channels; and manipulating the signal carried on at least one of the output signal channels based on the value of the stereo decoding parameter to create a stereophonic effect on the output signal channels.

31. The apparatus of claim 30, wherein the stereo decoding parameter comprises an explicit delay parameter, and wherein manipulating the signal carried on at least one of the output signal channels comprises delaying playout of the voice sample stream on at least one output signal channel, relative to playout of the voice sample stream on another output signal channel, based on the value of the explicit delay parameter.

32. The apparatus of claim 30, wherein the stereo decoding parameter comprises an explicit balance parameter, and wherein manipulating the signal carried on at least one of the output signal channels comprises modifying the playout amplitude of the voice sample stream on at least one output signal channel, relative to the playout amplitude of the voice sample stream on another output signal channel, based on the value of the explicit balance parameter.

33. The apparatus of claim 30, wherein the stereo decoding parameter comprises an explicit arrival angle parameter, and wherein manipulating the signal carried on at least one of the output signal channels comprises calculating a delay parameter for at least one output signal channel to create the perception that the audio signal represented in the voice sample stream is arriving at an angle corresponding to the explicit arrival angle parameter.

* * * * *

UNITED STATES PATENT AND TRADEMARK OFFICE

CERTIFICATE OF CORRECTION

PATENT NO. : 6,973,184 B1
APPLICATION NO. : 09/614535
DATED : December 6, 2005
INVENTOR(S) : Shaffer et al.

It is certified that error appears in the above-identified patent and that said Letters Patent is hereby corrected as shown below:

At column 10, line 6, please replace “input 10” with --input I0--

At column 17, line 10, please replace “sample steam” with --sample stream--

Signed and Sealed this

Thirtieth Day of January, 2007

JON W. DUDAS
*Director of the United States Patent and Trademark Office*